(12) United States Patent
Roughton

(10) Patent No.: US 8,979,959 B2
(45) Date of Patent: Mar. 17, 2015

(54) INDUSTRIAL AIR VACUUM FILTER ASSEMBLY

(71) Applicant: Jason Roughton, Saginaw, MI (US)

(72) Inventor: Jason Roughton, Saginaw, MI (US)

(73) Assignee: Torching Solutions, LLC, Flint, MI (US)

( * ) Notice: Subject to any disclaimer, the term of this patent is extended or adjusted under 35 U.S.C. 154(b) by 26 days.

(21) Appl. No.: 13/856,883

(22) Filed: Apr. 4, 2013

(65) Prior Publication Data

US 2013/0283741 A1  Oct. 31, 2013

Related U.S. Application Data

(60) Provisional application No. 61/620,181, filed on Apr. 4, 2012.

(51) Int. Cl.
*B01D 46/00* (2006.01)
*B01D 45/06* (2006.01)
*B01D 45/08* (2006.01)
*B01D 50/00* (2006.01)

(52) U.S. Cl.
CPC ............ *B01D 46/0023* (2013.01); *B01D 45/06* (2013.01); *B01D 45/08* (2013.01); *B01D 50/002* (2013.01)
USPC .......................................................... 55/323

(58) Field of Classification Search
CPC .. B01D 46/0023; B01D 50/002; B01D 45/08; B01D 45/06; B01D 46/10; F24F 2001/0096; Y10S 55/03; Y10S 55/08
USPC ......... 55/315, 318, 320–323, DIG. 3, DIG. 8, 55/434, 437–439, 467, 472, 473; 96/1; 454/49, 56–58, 60, 61, 63–67; 15/149, 15/257, 300, 422, 300.1
See application file for complete search history.

(56) References Cited

U.S. PATENT DOCUMENTS

| | | | | |
|---|---|---|---|---|
| 4,050,367 A | * | 9/1977 | Eakes | 454/56 |
| 4,108,051 A | * | 8/1978 | Eakes | 454/56 |
| 4,125,062 A | * | 11/1978 | Eakes | 454/56 |
| 4,268,282 A | * | 5/1981 | MacKenzie | 96/58 |
| 4,333,745 A | * | 6/1982 | Zeanwick | 95/287 |
| 4,650,504 A | * | 3/1987 | Howeth | 55/302 |
| 4,673,492 A | * | 6/1987 | Jasinski | 209/477 |
| 4,810,269 A | * | 3/1989 | Stackhouse et al. | 96/381 |
| 4,832,717 A | * | 5/1989 | Peters | 55/473 |
| 4,947,510 A | * | 8/1990 | English | 15/310 |
| 5,120,333 A | * | 6/1992 | Davis | 55/338 |
| 5,251,608 A | * | 10/1993 | Cote | 126/299 D |
| 5,281,246 A | * | 1/1994 | Ray et al. | 55/302 |
| 5,433,763 A | * | 7/1995 | Shagott et al. | 55/323 |

(Continued)

*Primary Examiner* — Duane Smith
*Assistant Examiner* — Sonji Turner
(74) *Attorney, Agent, or Firm* — Miller Canfield

(57) ABSTRACT

An air vacuum filter assembly is disclosed for use in filtering particulates from smoke and air during scrap metal cutting processes. The air vacuum filter assembly includes an enclosed container forming an air chamber therethrough between an air inlet and an exhaust outlet. A pair of fans creates a vacuum pressure in the container to suction air through the air chamber. A deflector within the enclosed container deflects and directs the air along a predetermined path through the air chamber between the air inlet and exhaust outlet. A series of filters are provided in the air flow path to filter and clean particulates from the smoke and air prior to the air exiting the container through the exhaust outlet and into the atmosphere.

14 Claims, 7 Drawing Sheets

(56) References Cited

U.S. PATENT DOCUMENTS

| | | | |
|---|---|---|---|
| 5,656,242 A * | 8/1997 | Morrow et al. | 96/224 |
| 5,807,414 A * | 9/1998 | Schaefer | 55/385.2 |
| 6,077,473 A * | 6/2000 | Diederich et al. | 266/48 |
| 6,183,527 B1 * | 2/2001 | O'Banion et al. | 55/385.1 |
| 6,286,177 B1 * | 9/2001 | Robinson | 15/301 |
| 6,290,740 B1 * | 9/2001 | Schaefer | 55/385.2 |
| 6,428,611 B1 * | 8/2002 | Andolino et al. | 96/25 |
| 6,537,337 B2 * | 3/2003 | Mullins et al. | 55/361 |
| 6,663,698 B2 * | 12/2003 | Mishin et al. | 96/142 |
| 6,740,142 B2 * | 5/2004 | Buettner et al. | 95/273 |
| 6,869,468 B2 * | 3/2005 | Gibson | 96/224 |
| 6,878,195 B2 * | 4/2005 | Gibson | 96/224 |
| 7,387,652 B2 * | 6/2008 | Studer | 55/338 |
| 7,407,621 B2 | 8/2008 | Keith | |
| 7,670,441 B2 | 3/2010 | Keith | |
| 7,833,305 B1 * | 11/2010 | Studer | 55/419 |
| 8,460,417 B2 * | 6/2013 | Reid et al. | 55/356 |
| 2008/0053047 A1 * | 3/2008 | Studer | 55/471 |

* cited by examiner

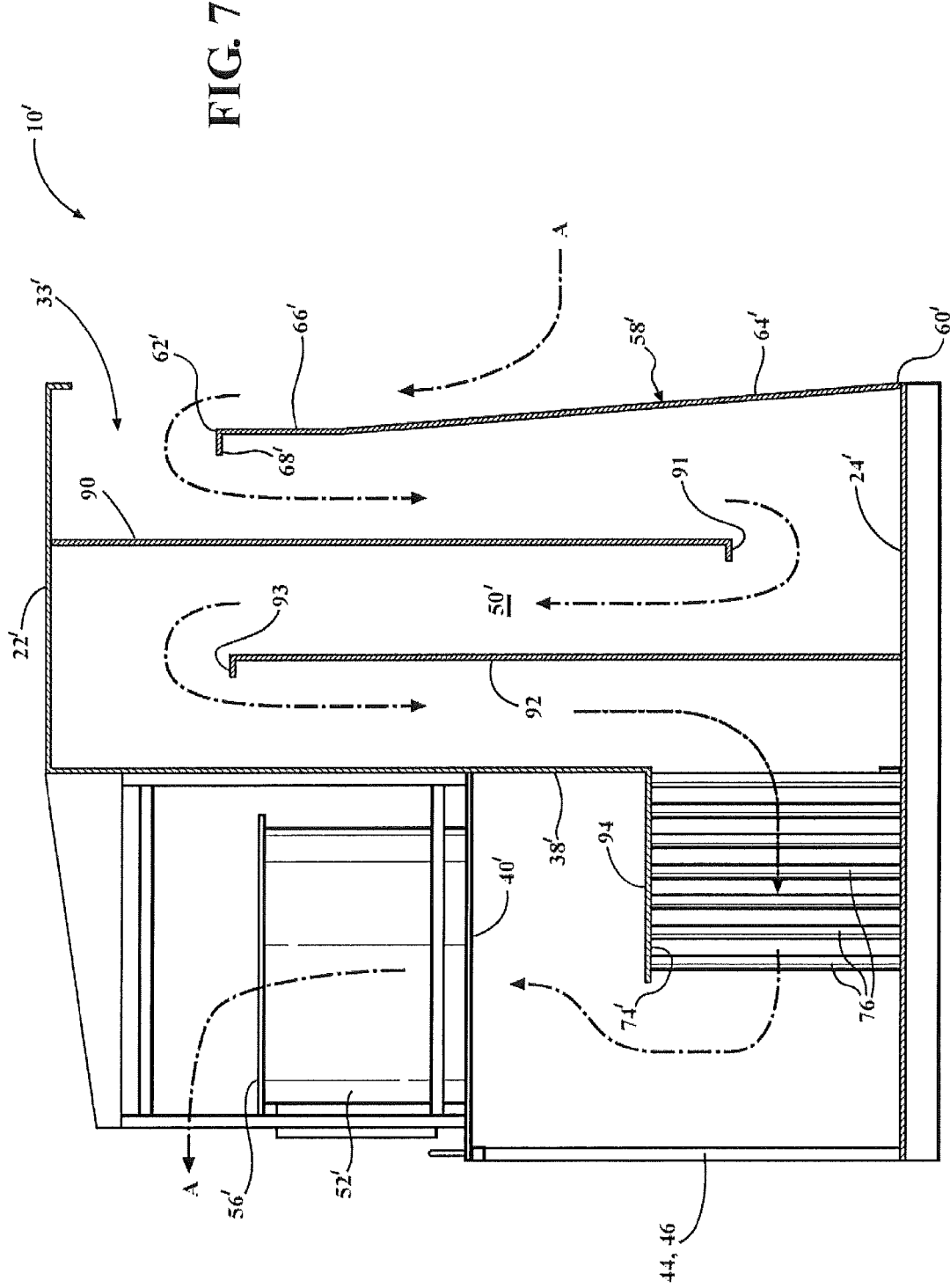

INDUSTRIAL AIR VACUUM FILTER ASSEMBLY

CROSS-REFERENCE TO RELATED APPLICATION

This application claims priority to and all the benefits of U.S. Provisional Application No. 61/620,181, filed on Apr. 4, 2012 and entitled "Industrial Air Vacuum Filter Assembly".

BACKGROUND OF THE INVENTION

1. Field of the Invention

This invention relates to an industrial air vacuum filter assembly. More particularly, this invention relates to an air vacuum filter assembly for capturing and filtering air, smoke, dust and particulates during cutting operations of scrap metal.

2. Description of Related Art

During the recycling of scrap metal, large pieces of steel, iron, or other metals must be cut down to smaller more manageable and usable pieces. Scrap metal yards utilize oxygen gas cutting torches to cut large pieces of metal from automobiles, buildings, appliances, bridges, heavy machinery and the like, into smaller pieces for recycling, transport and use by smelters in the steel production process. The scrap metal yards are open-air yards wherein torch cutters use the oxygen gas cutting torches to cut the metal into the smaller pieces.

However, the oxygen gas cutting torches used to cut the metal generate air-borne particulates in the smoke. The smoke from the cutting process is potentially harmful to the environment, atmosphere and torch cutters. In some instances, government agencies require containment of the smoke and air-borne particulates.

It is desirable therefore to provide an air vacuum filter assembly for capturing and filtering the smoke during the torch cutting operation to reduce the air-borne particulates to acceptable opacity.

SUMMARY OF THE INVENTION

According to one aspect of the invention, a vacuum filter assembly is provided for filtering particulates from air during a scrap metal cutting process The vacuum filter assembly comprises a container defining an enclosed air chamber between an air inlet and an exhaust outlet. At least one deflector is positioned within the container for deflecting and directing the flow of air along a predetermined path within the air chamber from the air inlet to the exhaust outlet. At least one fan is operatively coupled to the container and in fluid communication with the air chamber for creating a vacuum suctioning air through the air chamber between the air inlet and the exhaust outlet. A series of filters are positioned within the air chamber along the predetermined air flow path for filtering particulates from the air prior to the air exiting the exhaust outlet to the atmosphere.

BRIEF DESCRIPTION OF THE DRAWINGS

Advantages of the present invention will be readily appreciated as the same becomes better understood by reference to the following detailed description when considered in connection with the accompanying drawings wherein:

FIG. 7 is a partially-sectioned side view of an industrial air vacuum filter assembly and air flow path according to an alternative embodiment of the invention.

DETAILED DESCRIPTION OF THE EMBODIMENTS

Figure 1:
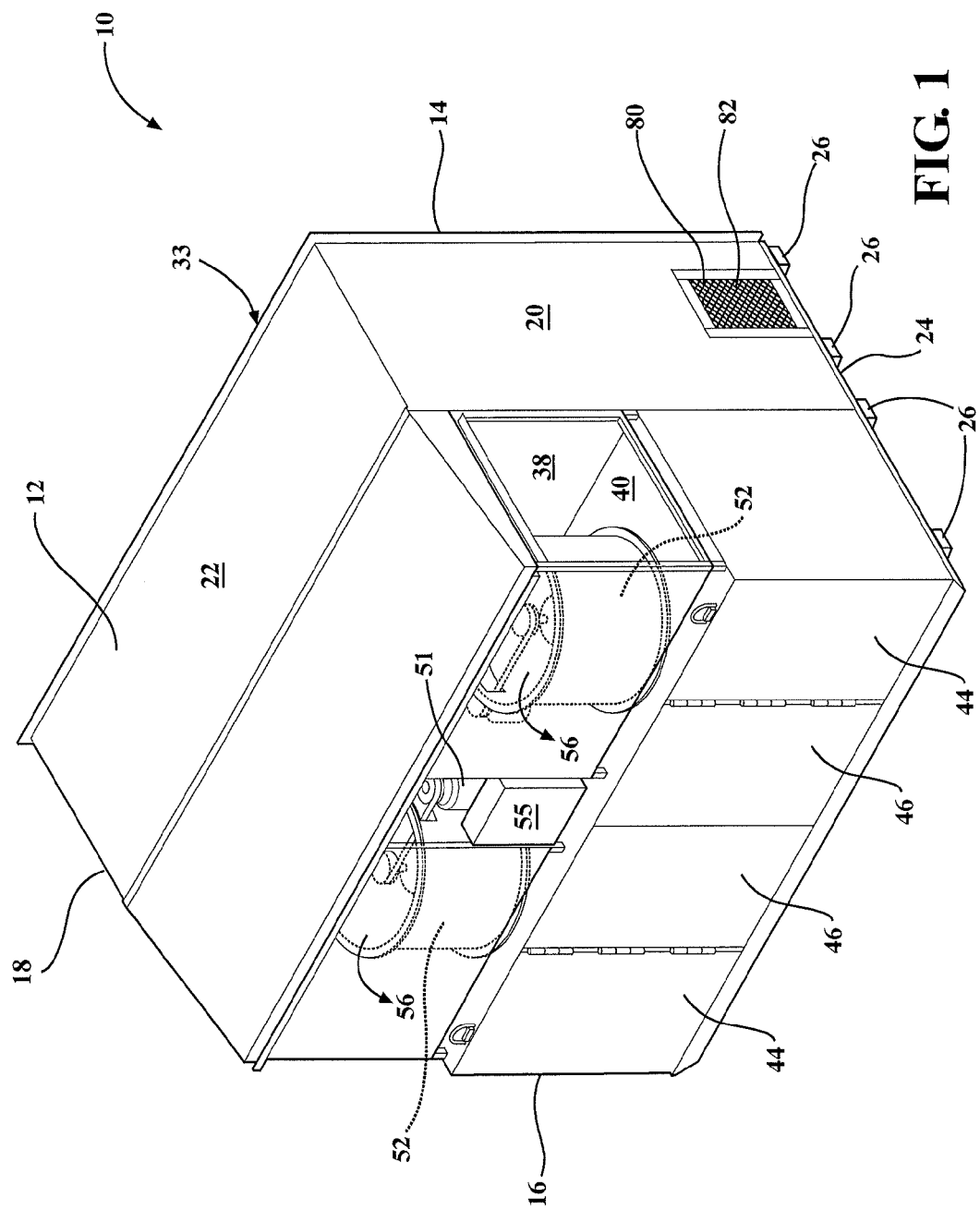
FIG. 1 is a perspective view of an industrial air vacuum filter assembly according to one embodiment of the invention.

Referring to the Figures, an industrial air vacuum filter assembly according to one embodiment of the invention is illustrated generally at 10 in FIG. 1. The assembly 10 includes an enclosure or container 12 having a front inlet side 14, a rear side 16, opposing support sides 18, 20, a top wall 22, and a bottom wall or floor 24. A plurality of support tubes or skids 26 extending transversely across and, are secured to the bottom wall 24 to support the container 12 and provide portability of the assembly 10 about a scrap yard or job site through engagement by a fork lift.

Figure 2:
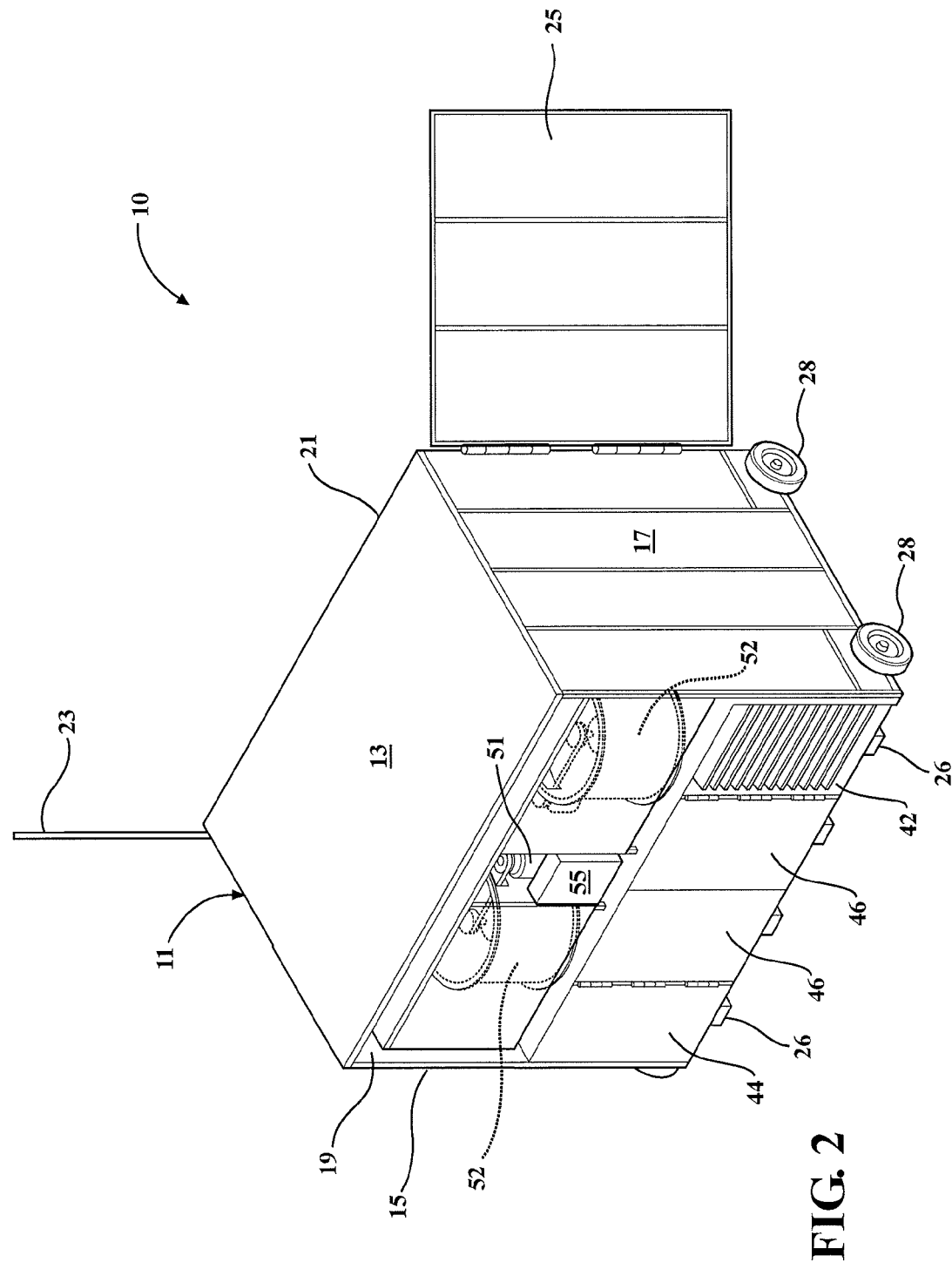
FIG. 2 is a perspective view of the industrial air vacuum filter assembly according to FIG. 1 with the access doors opened
Figure 3:
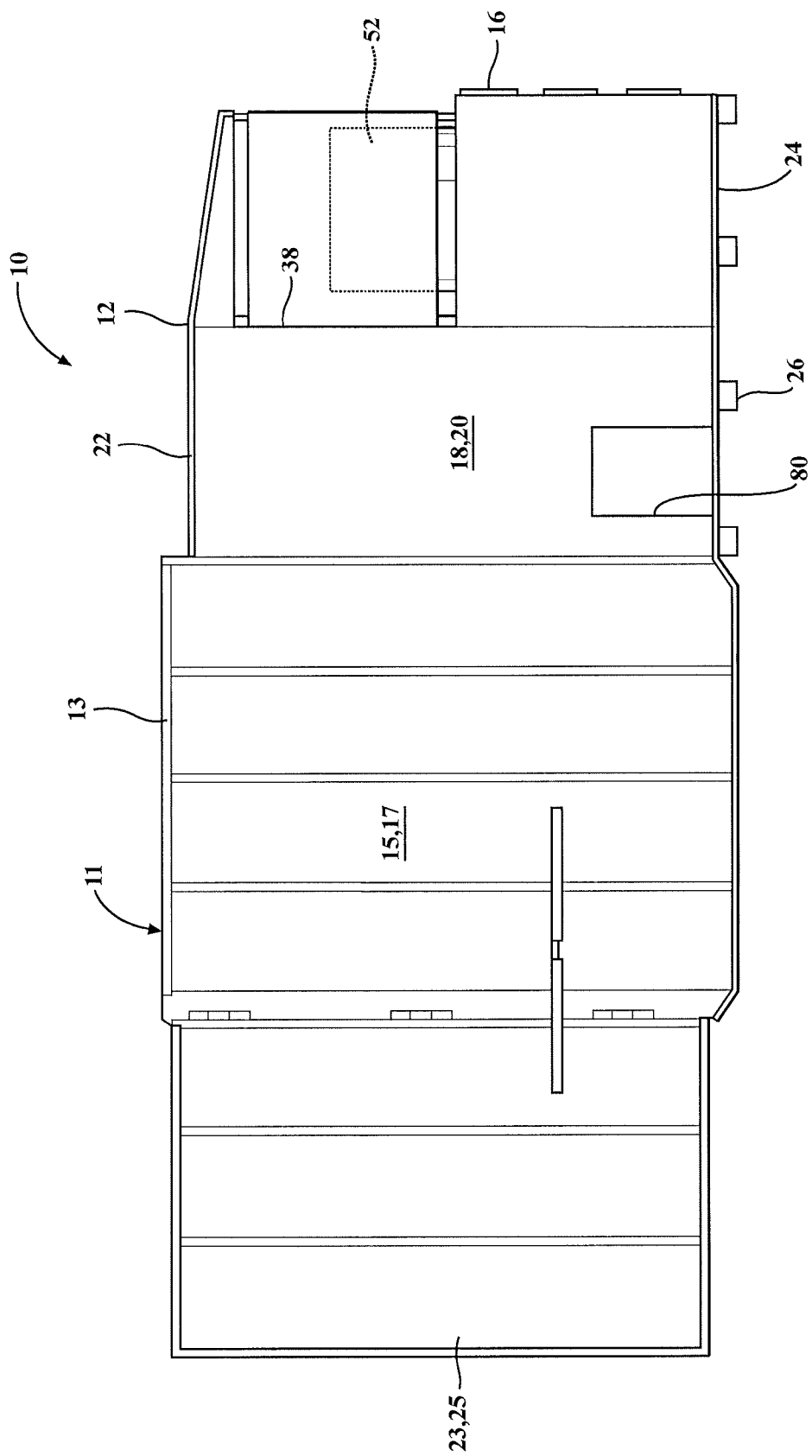
FIG. 3 is a side view of the industrial air vacuum filter assembly with the canopy extended and access doors opened.

Referring to FIGS. 2 and 3, the air vacuum filter assembly 10 may be housed within a canopy enclosure 11. The canopy 11 includes a top cover 13 for covering the container 12, a pair of side walls 15, 17 parallel with the support sides 18, 20, a rear opening 19 for receiving the container 12, a front opening 21 for providing access to the front inlet side 14 of the container 12, and a pair of doors 23, 25 pivotally coupled to the respective side walls 15, 17 by hinges along opposing sides of the front opening 21 for closing the front opening 21. A plurality of wheels 28 are rotatably coupled to the opposing side walls 15, 17 of the canopy 11 to allow the canopy 11 of move relative to the assembly 10 between a stowed position with the assembly 10 enclosed within the canopy 11, as shown in FIG. 2, and an extended use position with the assembly 10 positioned within the rear opening 19, as shown in FIG. 3, as will be described further hereinbelow. It should be appreciated that the wheels 28 may be rotatably mounted directly to the container 12 of the assembly 10 and the doors 23, 25 may be pivotally hinged to the support sides 18, 20 of the container 12 for closing the front inlet side 14 thereof without varying from the scope of the invention.

Referring to FIGS. 1-6, the front inlet side 14 is defined by the distal ends of the top wall 22, bottom wall 24, and support sides 18, 20 forming an air inlet 33 into the container 12. The pair of doors 23, 25 selectively cover the front inlet side 14 and close the air inlet 33 during transport of the assembly 10 about the scrap yard or job site. The rear side 16 includes a rear upper wall 38, an upper shelf 40 generally parallel with and spaced from the bottom wall 24, and a lower rear opening 42 extending from the upper shelf 40 to the bottom wall 24 and laterally between the opposing sides 18, 20. A pair of rear doors 44, 46 are pivotally coupled to the respective sides 18, 20 of the container 12 by hinges for selectively closing the lower rear opening 42 or providing access thereto. The container 12 forms an air chamber 50 defined by the top wall 22, rear upper wall 38, bottom wall 24, upper shelf 40, and rear doors 44, 46.

A pair of fans 52 are mounted to the upper shelf 40 and in fluid communication with the air chamber 50. The fans 52 may be gas, diesel, or electric motor driven to create an air flow between an inlet end 54 and an exhaust outlet end 56. The fans 52 create a vacuum of air flow through the air chamber 50 from the air inlet 33 to the exhaust outlet end 56. A pair of motors 51 are also mounted to the upper shelf 40 and operatively coupled to the respective pair of fans 52 by belts 53 to drive the fans 52. The motors 51 may be electronically powered or powered by gas, diesel, propane, natural gas or other readily available power source.

The assembly 10 further includes an air flow baffle or deflector 58 for directing and channeling the air flow through the air chamber 50 from the air inlet 33 to the exhaust outlet 56. The deflector 58 extends between a first lower end 60 fixedly secured to the bottom 24 of the container 12 to an opposite upper distal end 62 spaced below the top wall 22. The defector 58 includes an angled portion 64 protecting from the bottom wall 24 inwardly into the air chamber 50 to an upper vertical portion 66 extending generally parallel to the rear upper wall 38 to a distal end plate 68 spaced generally parallel to the top wall 22. The defector 58 also extends transversely between and is fixedly secured to the opposing support sides 18, 20.

Figure 5:
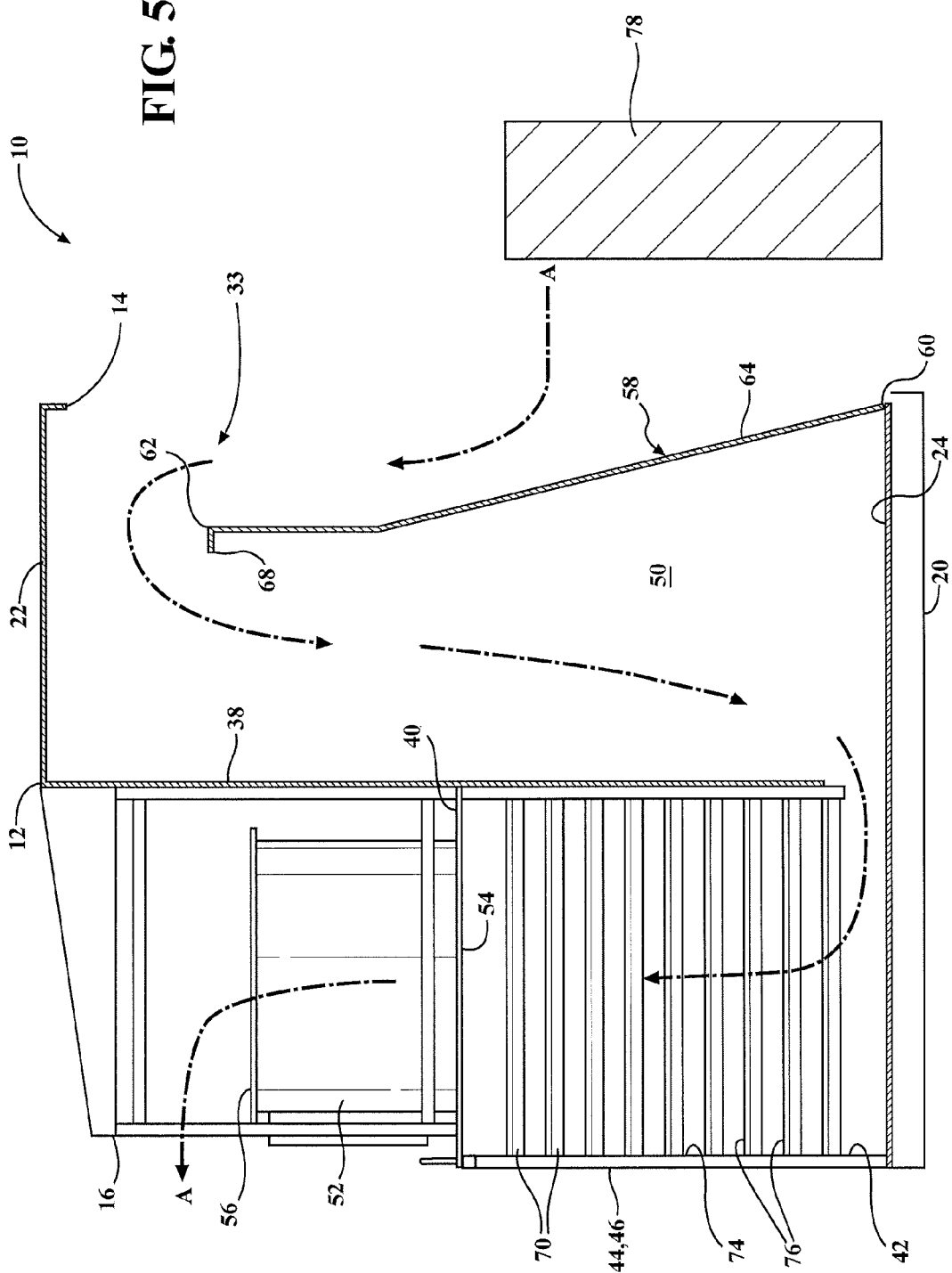
FIG. 5 is a partially-sectioned side view of the air vacuum filter assembly and air flow path.
Figure 6:
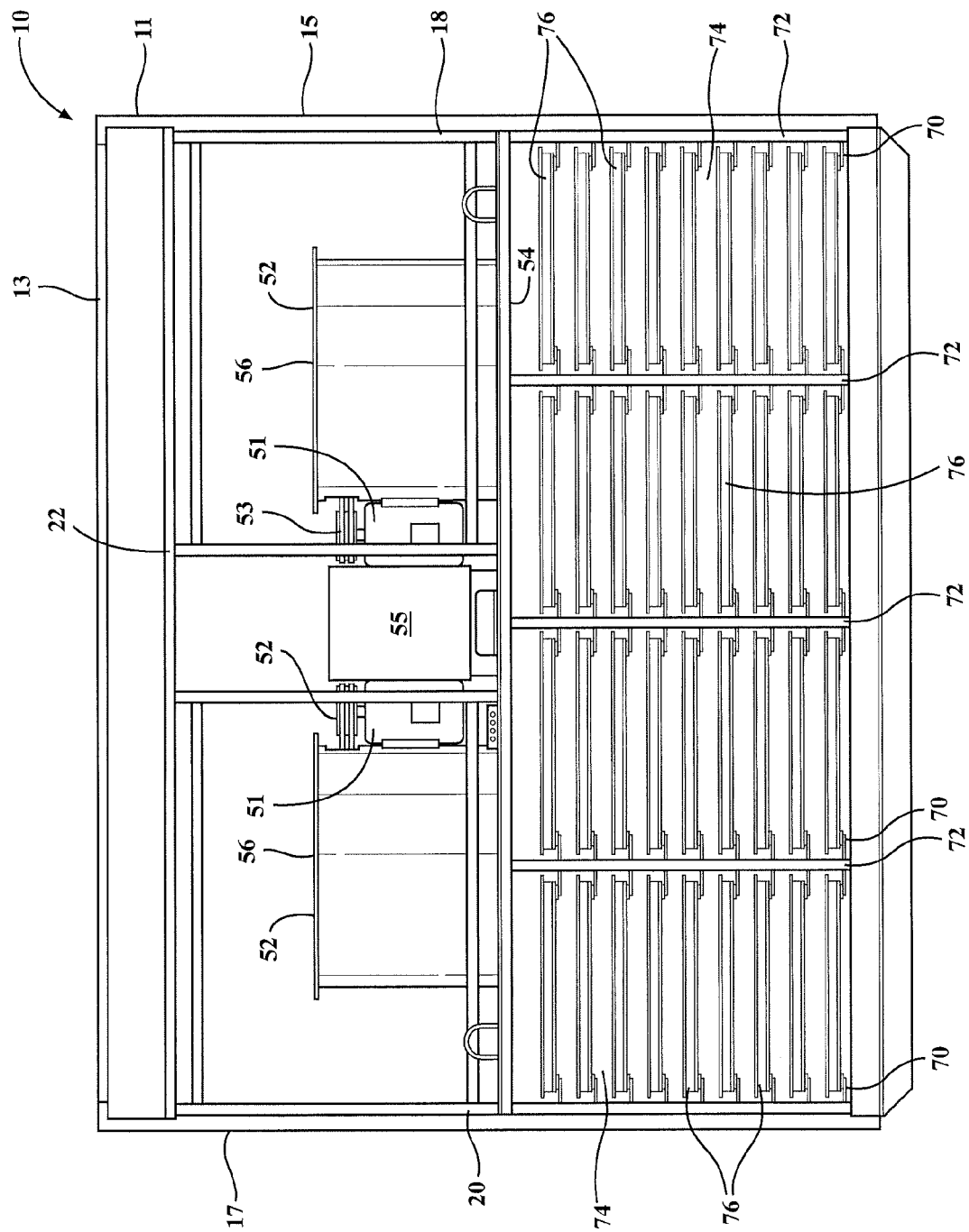
FIG. 6 is a rear planar view of the air vacuum filter assembly with the rear filter doors opened showing the matrix of air filters.

Referring to FIGS. 5 and 6, the assembly 10 includes a series or matrix of support trays 70 equally spaced apart between the floor 24 and the upper shelf 40 and extending from the lower rear opening 42 to a plane aligned with the rear upper wall 38. The matrix of support trays 70 are divided laterally by vertical support walls 72 to form a plurality of vertical rows of support trays 70 defining a series of slots 74 therebetween. A filter 76 is positioned within each of the slots 74 and supported by the support trays 70 to filter the air flowing through the air chamber 50. It should be appreciated that the support trays 70 may be formed by pair of ledges, an L-shaped channel or a U-shaped channel secured to the support walls 72 and capable of supporting the filters 76 thereon between spaced apart opposing support walls 72 without varying from the scope of the invention.

Finally, as shown in FIGS. 1 and 3, the assembly 10 further includes an secondary air inlet opening 80 formed in one of the support sides 18, 20 adjacent the bottom wall 24 and in fluid communication with the air chamber 50. A filter 82 is seated within the secondary air inlet opening 80 to prevent dust, debris, or other particulates from entering the air chamber 50. The secondary air inlet opening 80 improves the air flow and vacuum created by the fans 52 between the air inlet 33 and exhaust outlet 56.

Figure 4:
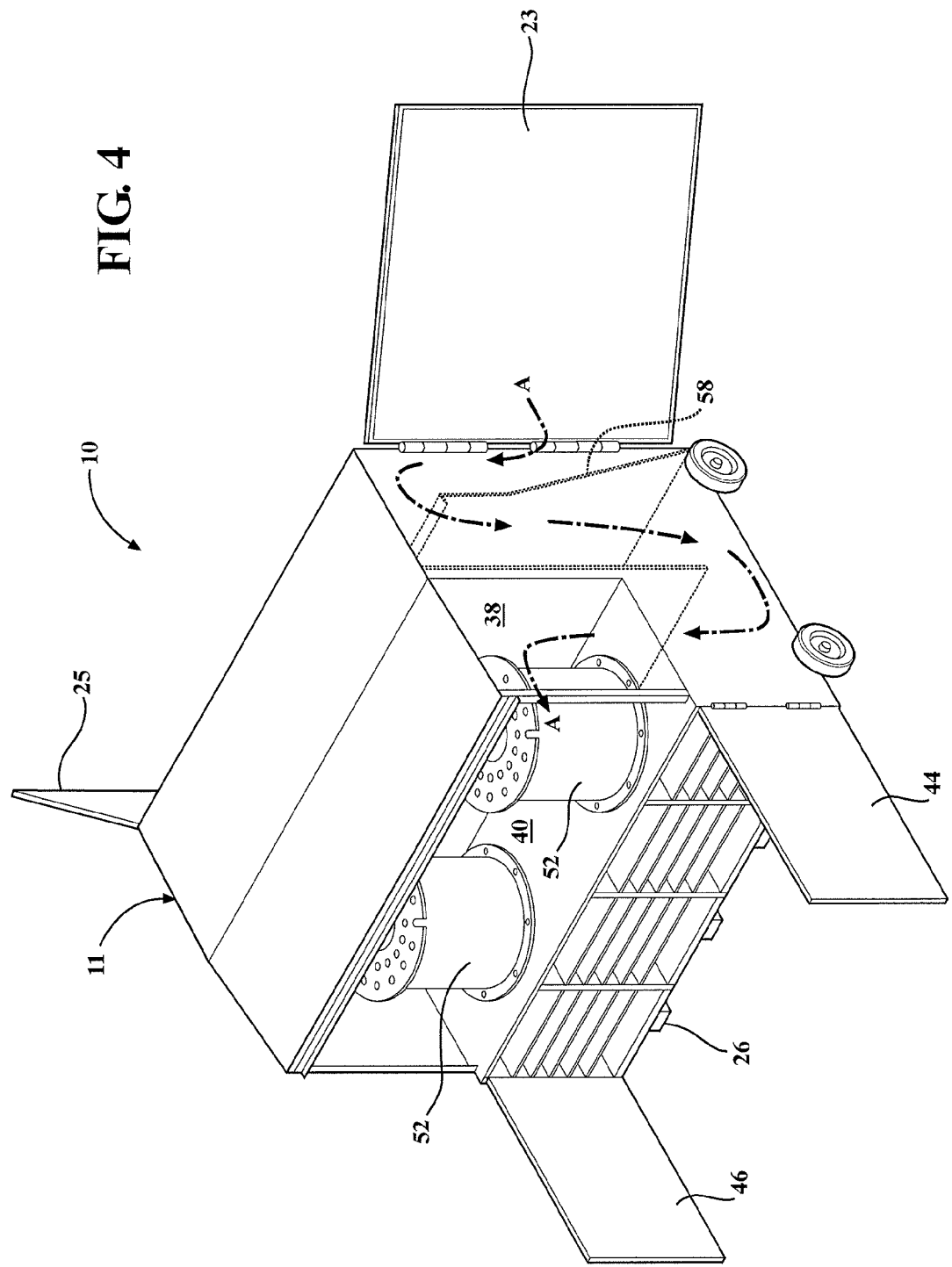
FIG. 4 is a partially-sectioned perspective view of the air vacuum filter assembly with the access doors opened and rear filter doors open providing access to the filters.

In operation, larger sections of steel and other metals in a scrap yard must be cut down to manageable and recyclable sizes. The cutting of steel is typically done by use of an oxygen torch cutting device. However, cutting the steel with an oxygen torch produces smoke with airborne particulates. The air vacuum filter assembly 10 is arranged to intake or vacuum the air, smoke and airborne particulates given off during the torch cutting process and exhaust filtered air back into the atmosphere. More specifically, the air vacuum filter assembly 10 is portable and may be positioned about the scrap yard or job site in areas adjacent sections of steel or other metal to be cut by torches. If the assembly 10 is used with the canopy 11, then once the assembly 10 is positioned where desired, the canopy 11 is extended from the stowed position to the extended use position with the canopy doors 23, 25 pivoted open as shown in FIG. 3. The section of steel, exemplified at 78, is position inside the side walls 13, 15 of the canopy 11 and adjacent the air inlet 33 of the container 12. The fans 52 may be powered by gas, diesel or electric motors 51 to create a vacuum of suctioned air flowing through the air chamber 50 from the air inlet 33 to the exhaust outlet 56. FIGS. 4 and 5 show the path of air flow through the assembly 10 by air flow line A-A. As smoke is created from the torch cutting process of the steel, the assembly 10 suctions the smoke into the air inlet 33. The smoke is directed though the air inlet 33 and directed into the air chamber 50 by the deflector 58. The deflector 58 assists with deflecting and directing the flow of the smoke and diffusing the heat given off during the torch cutting process as the smoke travels through the air chamber 50. The smoke is drawn through the air chamber 50 as shown by air flow line A-A and suctioned through the series of filters 76 positioned in the slots 74 formed by the support trays 70. The series of filters 76 clean the smoke and remove airborne particulates and contaminants prior to exiting the container 12 through the exhaust outlets 56 and into the atmosphere. The series of filters 76 ensures that the air flow and smoke is filtered repeatedly as it flows through the air chamber 50. Particulates will be captured and trapped by the filters 76 wherein some of the larger particles will fall and collect in the bottom 24 of the container 12 while the smaller particles will be collected in the series of filters 76. The rear doors 44, 46 provide access to the series of filters 76 for cleaning and/or replacement as well as removal of any particulates which may be collected in the bottom 24 of the container 12. The type of filters 76 used within the assembly 10 may vary as desired depending on the size and type of particulates to be filtered, the life expectancy of the filter, and the number of filters used in the assembly 10.

Referring to FIG. 7, an alternative embodiment of the air vacuum filter assembly 10' is shown wherein like elements are illustrated in primed numbers. The filter assembly 10' of FIG. 7 includes the inlet air flow baffle or deflector 58' for directing and channeling the air flow through the air chamber 50' from the air inlet 33' to the exhaust outlet 56'. The deflector 58' extends between a first lower end 60' fixedly secured to the bottom 24' of the container 12' to an opposite upper distal end 62' spaced below the top wall 22'. The defector 58' includes an angled portion 64' projecting from the bottom wall 24' inwardly into the air chamber 50' to an upper vertical portion 66' extending generally parallel to the rear upper wall 38' to a distal end plate 68' spaced generally parallel to the top wall 22'. The defector 58' also extends transversely between and is fixedly secured to the opposing support sides 18', 20'. The alternative air vacuum filter assembly 10' also includes a plurality of secondary air flow baffles or deflectors 90, 92 for further channeling and directing air along a flow path in the air chamber 50' between the air inlet 33' and exhaust outlet 56'. The deflector 90 extends vertically downwardly from a first end fixed to the top wall 22' and spaced parallel from the vertical portion 66' of the deflector 58' to a distal end 91 spaced above the bottom wall 24'. The deflector 90 also extends transversely between as if fixedly secured to the opposing support sides 18', 20'. The deflector 92 extends vertically upwardly from first end fixed to the bottom wall 24' and spaced parallel from the deflector 90 to a distal end 93 spaced below the top wall 22'. The deflector 92 similarly extends transversely between and is fixedly secured to the opposing support sides 18'. 20'.

Additionally the array of filter support trays 70' and filters 76' are alternatively arranged vertically between the bottom wall 24' and a mid shelf 94' and arranged perpendicular to the air flow path leading into the inlet end 54' of the fans 52'. The assembly 10 of the alternative embodiment provides a longer air flow path between the air inlet 33' and exhaust outlet 56' which further dissipates heat from the torch cutting process and filters particulates from the smoke passing through the filters 76' prior to exiting into the atmosphere.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A vacuum filter assembly for filtering particulates from air during a scrap metal cutting process, said vacuum filter assembly comprising:
   a container defining an enclosed air chamber between an air inlet and an exhaust outlet, said container having a front inlet side, a rear side, a top wall extending between said front and rear sides, a bottom wall extending between said front and rear sides for supporting said container, and spaced apart side support walls extending between said front and rear sides;
   a primary air flow deflector positioned within said container for deflecting and directing the flow of air along a predetermined path within said air chamber from said air inlet to said exhaust outlet, said primary air flow deflector extending between a lower end fixed to said bottom wall and an upper distal end spaced below said top wall defining said air inlet therebetween;
   a secondary air flow deflector extending between an upper end fixed to said top wall and a lower distal end spaced above said bottom wall and spaced between said primary air flow deflector and said rear side for redirecting the air flow along said predetermined path through said air chamber between said air inlet and exhaust outlet;
   at least one fan operatively coupled to said container and in fluid communication with said air chamber for creating a vacuum suctioning air through said air chamber between said air inlet and said exhaust outlet; and
   a series of spaced apart and parallel filters positioned within said air chamber along said predetermined path between said secondary air flow deflector and said rear side adjacent said exhaust outlet for filtering particulates from the air prior to the air exiting the exhaust outlet to the atmosphere.

2. A vacuum filter assembly as set forth in claim 1 wherein said primary air flow deflector includes an angled portion extending from said bottom wall into said air chamber and a vertical portion extending from said angled portion to said upper distal end, said angled portion deflecting and directing air flow into said air inlet and said air chamber within said container.

3. A vacuum filter assembly as set forth in claim 2 wherein said secondary air flow deflector includes a vertical portion extending from said top wall to said lower distal end and spaced parallel to said vertical portion of said primary air flow deflector for defining said predetermined path of air flow.

4. A vacuum filter assembly as set forth in claim 3 wherein said container further includes a rear upper wall aligned vertically between said front inlet side and said rear side and extending downwardly from said top wall and spaced from said bottom wall, an upper shelf extending between said rear upper wall and said rear side for supporting said fan, and a lower rear opening formed in said rear side between said upper shelf and said bottom wall.

5. A vacuum filter assembly as set forth in claim 4 wherein said fan includes an inlet end in fluid communication with said air chamber and an opposite outlet end defining said exhaust outlet, said fan fixedly supported on said upper shelf.

6. A vacuum filter assembly as set forth in claim 5 further including at least one motor for actuating said fan to create a vacuum of air flow through said air chamber between said air inlet and said exhaust outlet.

7. A vacuum filter assembly as set forth in claim 6 further including a plurality of support trays spaced apart between said bottom wall and said upper shelf and extending between said lower rear opening and said rear upper wall defining a series of slots therebetween for receiving one of said series of filters.

8. A vacuum filter assembly as set forth in claim 7 further including a plurality of spaced apart vertical support walls extending between said bottom wall and said upper shelf forming a plurality of vertical rows of said support trays therebetween for receiving and supporting said series of filters.

9. A vacuum filter assembly as set forth in claim 8 further including a secondary air inlet opening formed in one of said support sides of said container and in fluid communication with said air chamber and a secondary filter seated in said secondary air inlet opening for filtering air entering into said air chamber through said secondary air inlet opening.

10. A vacuum filter assembly as set forth in claim 6 further including a plurality of support trays spaced apart between said bottom wall and a mid-shelf spaced parallel from said upper shelf and defining a series of vertical slots therebetween for receiving one of said series of filters.

11. A vacuum filter assembly as set forth in claim 9 or 10 further including a canopy having a top cover and a pair of side walls projecting vertically from said top cover defining a front opening and a rear opening for receiving said container therein, said canopy further includes a pair of doors pivotally coupled to said side walls for opening and closing said front opening.

12. A vacuum filter assembly as set forth in claim 11 wherein said canopy includes a plurality of wheels rotatably supported by said side walls for moving said canopy relative to said container between a stowed position wherein said container is enclosed within said canopy and an extended use position wherein said vacuum filter assembly is positioned within said front opening of said canopy.

13. A vacuum filter assembly for filtering particulates from air during a scrap metal cutting process, said vacuum filter assembly comprising:
   a container defining an enclosed air chamber between an air inlet and an exhaust outlet, said container having a front inlet side, a rear side, a top wall extending between said front and rear sides, a bottom wall extending between said front and rear sides for supporting said container, and spaced apart side support walls extending between said front and rear sides;
   a primary air flow deflector positioned within said container for deflecting and directing the flow of air along a predetermined path within said air chamber from said air inlet to said exhaust outlet, said at least one primary air flow deflector extending between a lower end fixed to said bottom wall and an upper distal end spaced below said top wall defining said air inlet therebetween;
   a secondary air flow deflector extending between an upper end fixed to said top wall and a lower distal end spaced above said bottom wall and spaced between said primary air flow deflector and said rear side for redirecting the air flow along said predetermined path through said air chamber between said air inlet and exhaust outlet;

at least one fan operatively coupled to said container and in fluid communication with said air chamber for creating a vacuum suctioning air through said air chamber between said air inlet and said exhaust outlet;

a series of spaced apart and parallel filters positioned within said air chamber along said predetermined path between said at least one secondary air flow deflector and said rear side adjacent said exhaust outlet for filtering particulates from the air prior to the air exiting the exhaust outlet to the atmosphere; and a plurality of support trays spaced apart between said bottom wall and said upper shelf and extending between said lower rear opening and said rear upper wall defining a series of slots therebetween for receiving one of said series of filters.

14. A vacuum filter assembly for filtering particulates from air during a scrap metal cutting process, said vacuum filter assembly comprising:

a container defining an enclosed air chamber between an air inlet and an exhaust outlet, said container having a front inlet side, a rear side, a top wall extending between said front and rear sides, a bottom wall extending between said front and rear sides for supporting said container, and spaced apart side support walls extending between said front and rear sides;

a primary air flow deflector positioned within said container for deflecting and directing the flow of air along a predetermined path within said air chamber from said air inlet to said exhaust outlet, said at least one primary air flow deflector extending between a lower end fixed to said bottom wall and an upper distal end spaced below said top wall defining said air inlet therebetween;

a secondary air flow deflector extending between an upper end fixed to said top wall and a lower distal end spaced above said bottom wall and spaced between said primary air flow deflector and said rear side for redirecting the air flow along said predetermined path through said air chamber between said air inlet and exhaust outlet;

at least one fan operatively coupled to said container and in fluid communication with said air chamber for creating a vacuum suctioning air through said air chamber between said air inlet and said exhaust outlet;

a series of spaced apart and parallel filters positioned within said air chamber along said predetermined path between said at least one secondary air flow deflector and said rear side adjacent said exhaust outlet for filtering particulates from the air prior to the air exiting the exhaust outlet to the atmosphere; and a plurality of support trays spaced apart between said bottom wall and a mid-shelf spaced parallel from said upper shelf and defining a series of vertical slots therebetween for receiving one of said series of filters.

* * * * *